(12) United States Patent
Tsuhako

(10) Patent No.: US 7,984,077 B2
(45) Date of Patent: Jul. 19, 2011

(54) DATA MANAGEMENT SYSTEM, DATA REGISTRATION DEVICE, DATA RETRIEVAL DEVICE, DATA MANAGEMENT METHOD AND PROGRAM

(75) Inventor: Shinichiro Tsuhako, Tokyo (JP)

(73) Assignee: NEC Corporation, Tokyo (JP)

( * ) Notice: Subject to any disclaimer, the term of this patent is extended or adjusted under 35 U.S.C. 154(b) by 352 days.

(21) Appl. No.: 12/055,580

(22) Filed: Mar. 26, 2008

(65) Prior Publication Data

US 2008/0263066 A1 Oct. 23, 2008

(30) Foreign Application Priority Data

Mar. 29, 2007 (JP) ................................ 2007-086900

(51) Int. Cl.
*G06F 17/30* (2006.01)
*G06F 7/00* (2006.01)
(52) U.S. Cl. ......... 707/803; 707/713; 707/756; 707/758
(58) Field of Classification Search ........................ None
See application file for complete search history.

(56) References Cited

U.S. PATENT DOCUMENTS

| | | | | |
|---|---|---|---|---|
| 5,793,381 | A * | 8/1998 | Edberg et al. | 345/467 |
| 6,204,782 | B1 * | 3/2001 | Gonzalez et al. | 341/90 |
| 6,438,516 | B1 * | 8/2002 | Davis | 704/8 |
| 6,643,653 | B1 * | 11/2003 | Chu | 1/1 |
| 7,086,004 | B2 * | 8/2006 | Atkin | 715/205 |
| 7,236,980 | B2 * | 6/2007 | Steele | 1/1 |
| 2006/0101015 | A1 * | 5/2006 | Wissink et al. | 707/6 |

FOREIGN PATENT DOCUMENTS

| | | | |
|---|---|---|---|
| JP | 2001125915 A | 5/2001 |
| JP | 2001125916 A | 5/2001 |
| JP | 2001236358 A | 8/2001 |

OTHER PUBLICATIONS

Japanese Office Action issued Mar. 10, 2009 for JP Application No. 2007-086900.
"http://www.unicode.org/unicode/reports/tr15/", Unicode Inc.
http://homepage1.nifty.com/nomenclator/unicode/normalization.htm.
Japanese Office Action dated Dec. 9, 2008 for JP Application No. 2007-086900.
Takaaki Sugiyama, "Jave SE 6 Exhaustive Analysis, Know How to Drive Mustang", Chapter 4, Internationalization Relation, Java Press, Japan, Gijutsu-Hyohron Co., Ltd., Feb. 15, 2006, vol. 46, pp. 19-22.
Takahiro Kudomi, "Establishment of new DTP Work Flow, Way to Introduction of InDesign", 7th InDesign CS and Name of Files, professional DTP, Japan, Kohgaku-Sha Co., Ltd., Feb. 1, 2005, Feb. 2005 issue, pp. 108-111.

* cited by examiner

*Primary Examiner* — Greta L Robinson
*Assistant Examiner* — James J Wilcox

(57) ABSTRACT

A designator designates whether to perform normalization for registration data or retrieval data that has been input, but does not perform the normalization. A data processor performs the normalization process in accordance with the designator's designation. A register registers the registration data into a data storage, registers the registration data into a drawer, and sets a pointer. A retriever employs the retrieval data to retrieve the pointer from the drawer, and acquires the data from the data storage. The data processor performs a first normalization process by converting a character sequence in the registration data or the retrieval data to a precomposed character, and a second normalization process by converting a compatibility character in the registration data or the retrieval data to a predetermined character. The second normalization process converts half-width characters into full-width characters. The first normalization process is performable after the second normalization process.

19 Claims, 6 Drawing Sheets

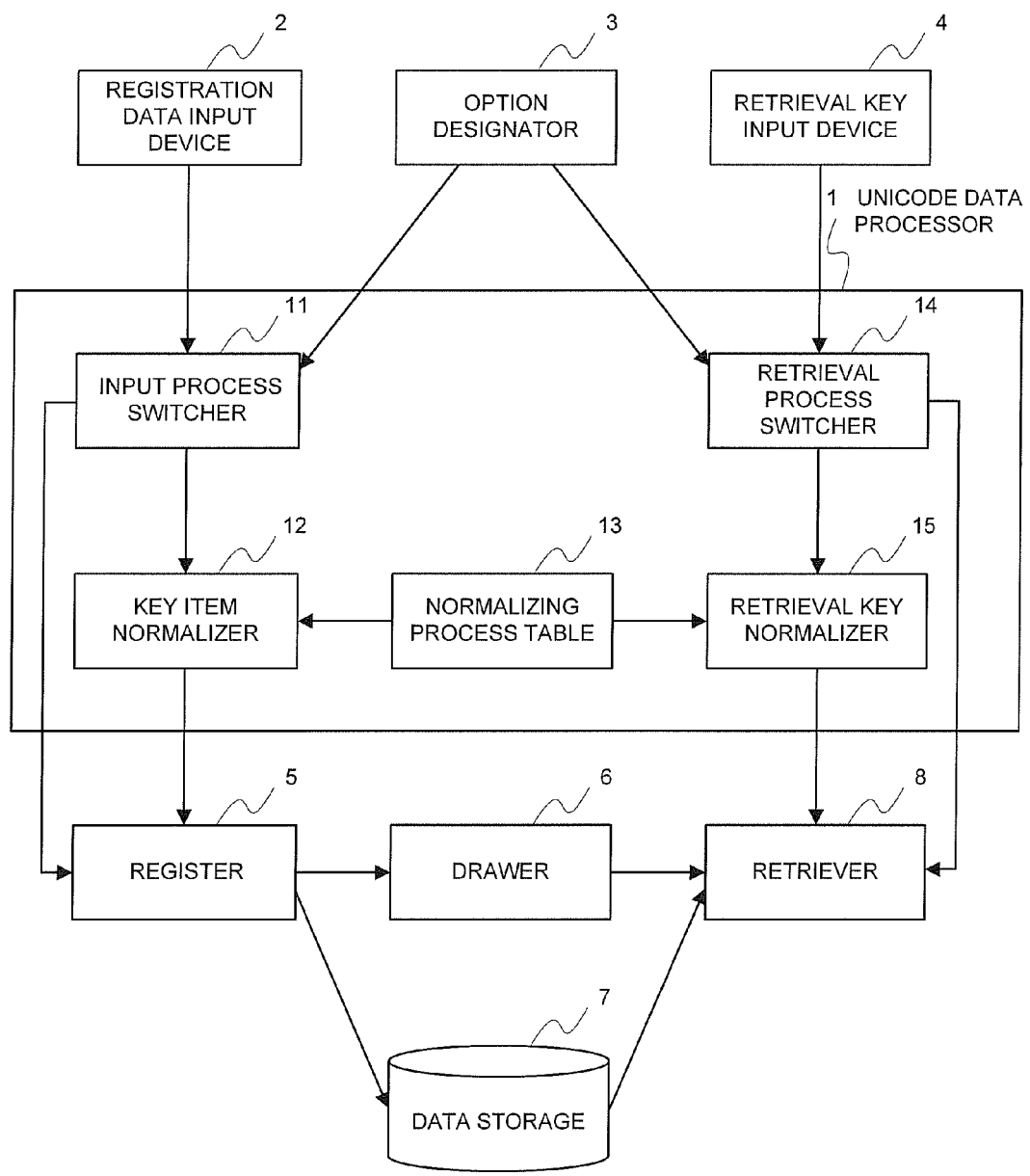

FIG. 2

| CHARACTER CODE 201 | CHARACTER NAME 202 | COMPOSITION/ COMPATIBILITY 203 | COMPOSITION 1 204 | COMPOSITION 2 205 | COMPOSITION 3 206 | AFTER-CONVERSION CHARACTER CODE 207 |
|---|---|---|---|---|---|---|
| 304B | HIRAGANA LETTER KA | COMPOSITION | 309B | — | — | 304C |
| 304C | HIRAGANA LETTER GA | — | — | — | — | — |
| ..... | | | ..... | | | |
| 307F | HIRAGANA LETTER MI | — | — | — | — | — |
| ..... | | | ..... | | | |
| 309B | COMBINING KATAKANA-HIRAGANA VOICED SOUND MARK | — | — | — | — | — |
| 309C | COMBINING KATAKANA-HIRAGANA SEMI-VOICED SOUND MARK | — | — | — | — | — |
| ..... | | | ..... | | | |
| 30CF | KATAKANA LETTER HA | COMPOSITION | 309B | — | — | 30D0 |
| 30CF | KATAKANA LETTER HA | COMPOSITION | 309C | — | — | 30D1 |
| 30D0 | KATAKANA LETTER BA | — | — | — | — | — |
| 30D1 | KATAKANA LETTER PA | — | — | — | — | — |
| ..... | | | ..... | | | |
| 30F3 | KATAKANA LETTER N | — | — | — | — | — |
| FF8A | HALFWIDTH KATAKANA LETTER HA | COMPATIBILITY | — | — | — | 30CF |
| FF9D | HALFWIDTH KATAKANA LETTER N | COMPATIBILITY | — | — | — | 30F3 |
| FF9F | HALFWIDTH KATAKANA SEMI-VOICED SOUND MARK | COMPATIBILITY | — | — | — | 309C |
| ..... | | | | | | |

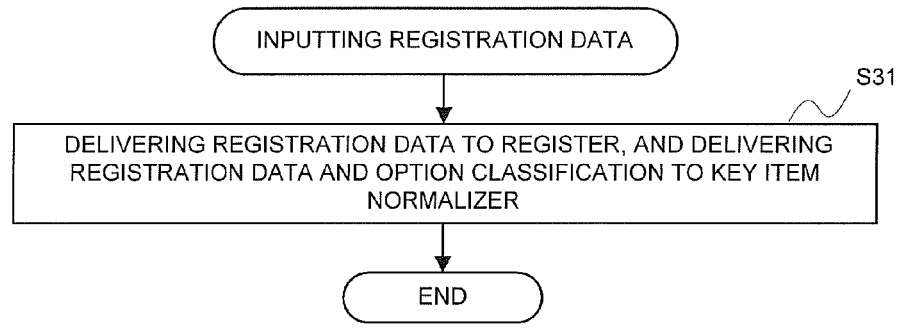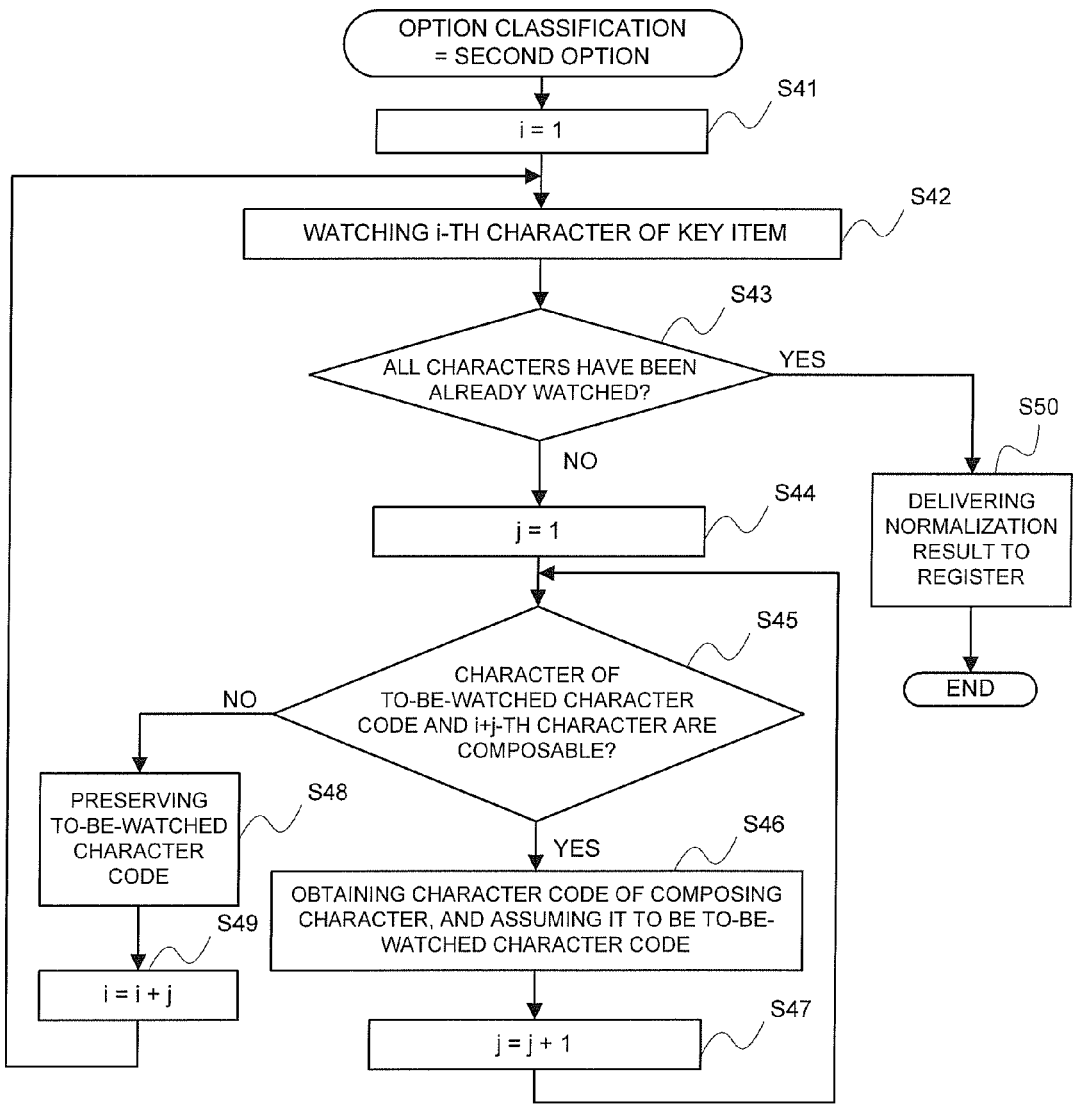

ary object of the present invention is
DATA MANAGEMENT SYSTEM, DATA REGISTRATION DEVICE, DATA RETRIEVAL DEVICE, DATA MANAGEMENT METHOD AND PROGRAM

INCORPORATED BY REFERENCE

This application is based upon and claims the benefit of priority from Japanese patent application No. 2007-086900, filed on Mar. 29, 2007, the disclosure of which is incorporated herein in its entirety by reference.

RELATED ART

The present invention relates to a data management technology of managing data expressed by a code system such as UNICODE in which techniques of expressing one character exist in plural, and more particularly to a data management technology that enables a data retrieval rich in flexibility to be executed.

Conventionally, various character codes such as a JIS code, an EUC code and UNICODE have been utilized. One character code is assigned to one character in the JIS code and the EUC code, whereby in a case of retrieving specific data from among a collective of data registered into a database etc., it is enough to retrieve data having a character code identical to that of a retrieval key.

In the UNICODE, however, as is often the case, so long as data having a character code identical to that of a retrieval key is retrieved, desired data cannot be retrieved because a concept of a composing character and a superposing character has been introduced into the UNICODE. In the UNICODE, so as to express a voiced sound/semi-voiced sound of kana letter, not only a precomposed character but also a combining character sequence is acceptable as a rule (composing character). Further, in the UNICODE, there is the case that different characters, for example, 「A (UNICODE: FF21)」(full-width character) and 「A (UNICODE: 0041)」(half-width character), 「°C. (UNICODE: 2103)」 and 「°(UNICODE: 00B0)+C (UNICODE: 0043)」 are regarded to be an identical character (compatibility character). For this, in a case of retrieving data expressed by the UNICODE, there is the case that so long as the character codes alone are compared, to-be-targeted data cannot be retrieved. For example, in a case where a character sequence 「が(UNICODE: 304B)+か(UNICODE: 304B)+゛(UNICODE: 309B)+さ(UNICODE: 307F)」 has been registered as data, the above-mentioned character sequence cannot be retrieved so long as 「が(UNICODE: 304B)+が(UNICODE: 304C)+さ(UNICODE: 307F)」 is input as a retrieval key. Further, in a situation in which a half-width character sequence 「NIHON (UNICODE: 004E, 0049, 0048, 004F, 004E)」 has been registered, the above-mentioned character sequence cannot be retrieved so long as a full-width retrieval key 「Ｎ Ｉ Ｈ Ｏ Ｎ (UNICODE: FF2E, FF29, FF28, FF2F, FF2E)」 is input. Additionally, the so-called combining character sequence is a sequence in which one combining character or more has been continued behind a base character.

On the other hand, conventionally, the data management device for normalizing the registration data and the retrieval key at the time of registering and retrieving data has been proposed (see, for example, Patent document 1). The related art described in Patent document 1 is configured so that at the time of registering data, the registration data is normalized according to a pre-decided normalizing rule (a rule of converting a full-width English capital character to a half-width English small character, and converting a half-width hiragana letter to a full-width hiragana letter, or the like), and after-normalization normalization registration data and original registration data (raw registration data) are stored in a data storage correspondingly to each other. Further, the related art is configured so that at the time of retrieving data, the retrieval key is normalized according to the above-mentioned normalizing rule, and the after-normalization normalization retrieval key is used to retrieve the corresponding raw registration data.
[Patent document 1] JP-P2001-125915A Utilizing the related art described in Patent document 1 to manage data expressed by UNICODE makes it possible to retrieve substantially identical data even though the each of the registration data and the retrieval key has a different expression format. For example, registration data 「か+か+゛+さ」can be retrieved with a retrieval key 「か+が+さ」. However, the related art of Patent document 1 is configured so that the retrieval key is normalized at any time, which gives rise to the problem that data as well other than the data that a user desires to retrieve results in being retrieved. For example, there exists the problem that even though the user desires to retrieve a half-width character sequence 「NIHON」, a full-width character sequence 「Ｎ Ｉ Ｈ Ｏ Ｎ」 as well results in being retrieved.

Thereupon, an exemplary object of the present invention is to provide a technology that allows a retrieval result suited for a user' desire to be obtained at the moment of retrieving data expressed by the code system such as the UNICODE in which techniques of expressing one character exist in plural.

SUMMARY OF THE INVENTION

The data management system relating to the present invention is characterized in including:

a designator for designating whether or not to perform a normalization process for registration data or retrieval data that has been input;

a data processor for performing the normalization process for the registration data or the retrieval data that has been input according to a designation by the designator;

a register for registering the registration data, which has been input, into a data storage, registering the registration data for which the normalization process has been performed into a drawer, and setting to the data registered into this drawer a pointer to the data registered into the data storage; and a retriever for employing the retrieval data, which has been input, or the retrieval data, for which the normalization process has been performed, to retrieve the pointer of its retrieval data from the drawer, and acquiring corresponding data from the data storage.

The data registration device relating to the present invention is characterized in including:

a designator for designating whether or not to perform a normalization process for registration data that has been input;

a data processor for performing the normalization process for the registration data that has been input according to a designation by the designator; and a register for registering the registration data, which has been input, into a data storage, registering the registration data for which the normalization process has been performed into a drawer, and setting to the data registered into this drawer a pointer to the data registered into the data storage.

The data retrieval device relating to the present invention is characterized in including:

a designator for designating whether or not to perform a normalization process for retrieval data that has been input; and a data processor for performing the normalization process for the retrieval data that has been input according to a designation by the designator; and a retriever for employing the retrieval data, which has been input, or the retrieval data, for which the normalization process has been performed, to retrieve a pointer of its retrieval data from a drawer, and acquiring corresponding data from a data storage.

The data management method relating to the present invention is characterized in including:

a designation step of designating whether or not to perform a normalization process for registration data or retrieval data that has been input;

a data processing step of performing the normalization process for the registration data or the retrieval data that has been input according to a designation in the designation step;

a first registration step of registering the registration data, which has been input, into a data storage;

a second registration step of registering the registration data for which the normalization process has been performed into a drawer, and setting to the data registered into this drawer a pointer to the data registered in the first registration step; and a retrieval step of employing the retrieval data, which has been input, or the retrieval data, for which the normalization process has been performed, to retrieve a pointer of its retrieval data from the drawer, and acquiring corresponding data from the data storage.

The data registration method relating to the present invention is characterized in including:

a designation step of designating whether or not to perform a normalization process for registration data that has been input;

a data processing step of performing the normalization process for the registration data that has been input according to a designation in the designation step;

a first registration step of registering the registration data, which has been input, into a data storage; and a second registration step of registering the registration data for which the normalization process has been performed into a drawer, and setting to the data registered into this drawer a pointer to the data registered in the first registration step.

The data retrieval method relating to the present invention is characterized in including:

a designation step of designating whether or not to perform a normalization process for retrieval data that has been input;

a data processing step of performing the normalization process for the retrieval data that has been input according to a designation in the designation step; and a retrieval step of employing the retrieval data, which has been input, or the retrieval data, for which the normalization process has been performed, to retrieve a pointer of its retrieval data from a drawer, and acquiring corresponding data from a data storage.

The present invention, which is a program record medium that is readable/writable by an information processing unit, is characterized in that a program recorded into the program record medium causes a data registration device to execute:

a designation step of designating whether or not to perform a normalization process for registration data that has been input;

a data processing step of performing the normalization process for the registration data that has been input according to a designation in the designation step;

a first registration step of registering the registration data, which has been input, into a data storage; and a second registration step of registering the registration data for which the normalization process has been performed into a drawer, and setting to the data registered into this drawer a pointer to the data registered in the first registration step.

The present invention, which is a program record medium that is readable/writable by an information processing unit, is characterized in that a program recorded into the program record medium causes a data retrieval device to execute:

a designation step of designating whether or not to perform a normalization process for retrieval data that has been input;

a data processing step of performing the normalization process for the retrieval data that has been input according to a designation in the designation step; and a retrieval step of employing the retrieval data, which has been input, or the retrieval data, for which the normalization process has been performed, to retrieve a pointer of its retrieval data from a drawer, and acquiring corresponding data from a data storage.

The data management device relating to the present invention is characterized in including:

a data storage;

a drawer of the above data storage;

a designator for designating whether or not to perform a normalization process;

a registration data input device for inputting registration data;

a retrieval key input device for inputting a retrieval key;

a register for registering the registration data, which has been input, into the data storage, and registering a key item, which has been input, into the drawer;

a retriever for searching the drawer with the retrieval key that has been input, and acquiring corresponding data from the data storage; and a data processor for inputting registration data input from the registration data input device, and a key item being included in the above registration data into the register, and inputting the retrieval key input from the retrieval key input device into the retriever, and for performing the normalization process for the key item and the retrieval key, which are input, according to a designation by the designator.

The data management device relating to the present invention is characterized in including:

a data storage;

a drawer of the above data storage;

a designator for designating whether or not to perform a normalization process;

a registration data input device for inputting registration data;

a register for registering the registration data, which has been input, into the data storage, and registering a key item, which has been input, into the drawer; and a data processor for inputting the registration data input from the registration data input device and a key item being included in the above registration data into the register, and for performing the normalization process for the key item being input according to a designation by the designator.

The data management device relating to the present invention is characterized in including:

a data storage;

a drawer of the above data storage;

a designator for designating whether or not to perform a normalization process;

a retrieval key input device for inputting a retrieval key;

a retriever for searching the drawer with the retrieval key that has been input, and acquiring corresponding data from the data storage; and a data processor for inputting the retrieval key input from the retrieval key input device into to the retriever, and for performing the normalization process for the retrieval key being input according to a designation by the designator.

The data management method relating to the present invention, which is a data management method of performing a data management by a computer including: a data storage; a drawer of the above data storage; a designator for designating whether or not to perform a normalization process; a registration data input device for inputting registration data; and a retrieval key input device for inputting a retrieval key, is characterized in that:

the computer includes a registration step of registering the registration data, which has been input, into the data storage, and registering the key item, which has been input, into the drawer;

the computer includes a retrieval step of searching the drawer with the retrieval key that has been input, and acquiring corresponding data from the data storage; and the computer includes a data processing step of inputting the registration data input from the registration data input device and a key item being included in the above registration data into the registration step, and inputting the retrieval key input from the retrieval key input device into the retrieval step, and for performing the normalization process for the key item and retrieval key being input according to a designation by the designator.

The data management method relating to the present invention, which is a data management method of performing a data management by a computer including: a data storage; a drawer of the above data storage; a designator for designating whether or not to perform a normalization process; and a registration data input device for inputting registration data, is characterized in that:

the computer includes a registration step of registering the registration data, which has been input, into the data storage, and registering a key item, which has been input, into the drawer; and the computer includes a data processing step of inputting the registration data input from the registration data input device and the key item being included in the above registration data into the registration step, and for performing a normalization process for the key item being input according to a designation by the designator.

The data management method relating to the present invention, which is a data management method of performing a data management by a computer including: a data storage; a drawer of the above data storage; a designator for designating whether or not to perform a normalization process; and a retrieval key input device for inputting a retrieval key, is characterized in that:

the computer includes a retrieval step of searching the drawer with the retrieval key that has been input, and acquiring corresponding data from the data storage; and the computer includes a data processing step of inputting the retrieval key input from the retrieval key input device into the retrieval step, and for performing the normalization process for the retrieval key being input according to a designation by the designator.

The program relating to the present invention causes a computer including: a data storage; a drawer of the above data storage; a designator for designating whether or not to perform a normalization process; a registration data input device for inputting registration data; and a retrieval key input device for inputting a retrieval key to function as:

a register for registering the registration data, which has been input, into the data storage, and registering a key item, which has been input, into the drawer;

a retriever for searching the drawer with the retrieval key that has been input, and acquiring corresponding data from the data storage; and a data processor for inputting registration data input from the registration data input device and a key item being included in the above registration data into the register, and inputting the retrieval key input from the retrieval key input device into to the retriever, and for performing a normalization process for the key item and retrieval key being input according to a designation by the designator.

The program relating to the present invention causes a computer including: a data storage; a drawer of the above data storage; a designator for designating whether or not to perform a normalization process; and a registration data input device for inputting registration data to function as:

a register for registering the registration data, which has been input, into the data storage, and registering a key item, which has been input, into the drawer; and a data processor for inputting registration data input from the registration data input device and the key item being included in the above registration data into the register, and for performing the normalization process for the key item being input according to a designation by the designator.

The program relating to the present invention causes a computer including: a data storage; a drawer of the above data storage; a designator for designating whether or not to perform a normalization process; and a retrieval key input device for inputting a retrieval key to function as:

a retriever for searching the drawer with the retrieval key that has been input, and acquiring corresponding data from the data storage; and a data processor for inputting the retrieval key input from the retrieval key input device into the retriever, and for performing the normalization process for the retrieval key being input according to a designation by the designator.

BRIEF DESCRIPTION OF THE DRAWINGS

This and other objects, features and advantages of the present invention will become more apparent upon a reading of the following detailed description and drawings, in which:

FIG. 1 is a block diagram illustrating an example of a configuration in an exemplary embodiment of a data management device relating to the present invention;

FIG. 2 is a view illustrating an example of a content of a normalization process table 13;

FIG. 3 is a flowchart illustrating an example of a process of an input process switcher 11;

FIG. 4 is a flowchart illustrating an example of a process of a key item normalizer 12 at the time that a second option has been designated as an option classification;

EXEMPLARY EMBODIMENTS

Figure 5:
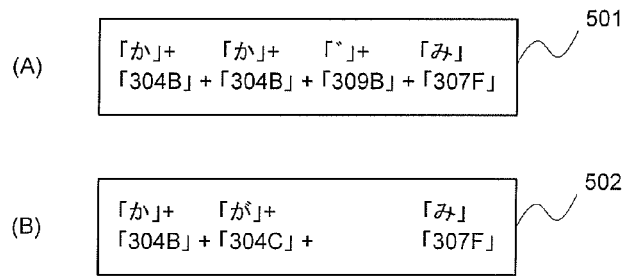
FIG. 5 is a view for explaining a process of the key item normalizer 12.

In the present invention, at the moment of registering the registration data including a composing character and a compatibility character, if a user desires to make the registration data retrievable with a normalized retrieval key as well, he/her pre-gives a designation for performing a normalization process by employing a designator. On the other hand, if a user desires to make the registration data unretrievable with a normalized retrieval key, he/her pre-gives a designation for performing no normalization process by employing a designator. Thereafter, the user inputs the registration data from a registration data input device. A data processor inputs the registration data that has been input and a key item being included in the registration data into a register. At that moment, if a designation for performing a normalization process has been given by a designator, the data processor firstly normalizes the key item, and then inputs it into the register. At the moment of performing data retrieval by employing the retrieval key including a composing character and a compatibility character, if a user desires to retrieve only data that coincides with the above-mentioned retrieval key, he/her pre-gives a designation for performing no normalization process by employing a designator. On the other hand, if a user desires to retrieve the registration data as well that substantially coincides with the retrieval key, he/her pre-gives a designation for performing a normalization process by employing a designator. Thereafter, the user inputs the retrieval key from a retrieval key input device. The data processor inputs the retrieval key, which has been input, into the retriever. At that moment, if a designation for performing a normalization process has been given by a designator, the data processor firstly normalizes the retrieval key, and then delivers it to the retriever, and if a designation for performing a normalization process has not been given, the data processor delivers it to the retriever as it stands. The retriever searches a drawer with the retrieval key that has been input, and acquires the corresponding data from a data storage.

Hereinafter, the best mode for carrying out the present invention will be explained in details by employing the accompanied drawings.

Upon making a reference to FIG. 1, the exemplary embodiment relating to the data management device of the present invention is comprised of a UNICODE data processor 1, a registration data input device 2, an option designator 3, a retrieval key input device 4, a register 5, a drawer 6, a data storage 7, and a retriever 8.

The registration data input device 2, which is realized with a keyboard, a data read device, or the like, inputs the registration data, which is stored, into the data storage 7. The key item (draw key) is included in this registration data.

The retrieval key input device 4, which is for inputting the retrieval key, is realized with a keyboard etc. The option designator 3, which is for designating which option, out of a first option to a fourth option, is employed to activate the UNICODE data processor 1, is realized, for example, with a switch etc. that can assume four statuses responding to the first option to the fourth option, respectively.

If the user does not desire that the UNICODE data processor 1 perform a normalization process, he/her designates the first option. Further, the user designates the second option if he/her desires that the UNICODE data processor 1 perform a normalization process (NFC normalization process) for allowing the composing character to be regarded as an identical character, the user designates the third option if he/her desires that it perform a normalization process (NFKC normalization process) for allowing the compatibility character to be regarded as an identical character, and the user designates the fourth option if he/her desires that it perform both of the NFC normalization process and the NFKC normalization process.

The UNICODE data processor 1 includes an input process switcher 11, a key item normalizer 12, a normalization process table 13, a retrieval process switcher 14, and a retrieval key normalizer 15.

A rule for normalizing data expressed by the UNICODE has been registered into the normalization process table 13. This rule obeys such a policy of converting to a unique character that is finally obtained by repeating a composition process and a compatibility process.

FIG. 2 is a view illustrating an example of a content of the normalization process table 13. In a character code 201, a code of each character is set. In a character name 202, a unique name assigned to each character is set as reference information. In composition/compatibility 203, "composition" is set if a certain composing character can be configured by employing its character and a character that follows it, and "compatibility" is set if a compatibility character for its character is assigned. In composition 1 (204), composition 2 (205), and composition 3 (206), the character following its character that is used in a case of configuring a composing character is set. In an after-conversion character code 207, a character code after composition or compatibility is set.

The input process switcher 11 delivers the registration data input from the registration data input device 2 to the register 5 and the key item normalizer 12, and delivers the option classification designated by the option designator 3 to the key item normalizer 12.

The key item normalizer 12 normalizes the key item being included in the registration data according to the normalization process table 13 when the option classification delivered from the input process switcher 11 is one of the second option to the fourth option, and delivers a normalization result to the register 5. At that moment, the key item normalizer 12 performs the NFC normalization process in a case where the option classification "second option" has been designated, it performs the NFKC normalization process in case where the option classification "third option" has been designated, and it performs both of the NFC normalization process and the NFKC normalization process in a case where the fourth option has been designated. Further, if the option classification delivered from the input process switcher 11 is the first option, the key item normalizer 12 delivers the key item being included in the registration data to the register 5.

The retrieval process switcher 14 delivers the retrieval key input from the retrieval key input device 4 to the retriever 8 in a case where the first option has been designated by the option designator 3. Further, the retrieval process switcher 14 delivers the retrieval key input from the retrieval key input device 4 and the option classification designated by the option designator 3 to the retrieval key normalizer 15 in a case where one of the second option to the fourth option has been designated by the option designator 3.

The retrieval key normalizer 15 normalizes the retrieval key input from the retrieval key input device 4 according to the normalization process table 13, and delivers a normalization result to the retriever 8. At that moment, the retrieval key normalizer 15 performs the NFC normalization process in a case where the option classification "second option" together with the retrieval key has been delivered, it performs the NFKC normalization process in a case where the option classification "third option" has been delivered, and it performs both of the NFC normalization process and the NFKC normalization process in a case where the fourth option has been delivered.

The register 5 registers the registration data delivered from the input process switcher 11 into the data storage 7, registers the key item delivered from the key item normalizer 12 into the drawer 6, and sets a pointer to the registration data from the key item.

The retriever 8, in a case where the retrieval key has been input from the retrieval process switcher 14, retrieves the corresponding data from the data storage 7 according to the pointer set to the drawer 6 correspondingly to the above-mentioned retrieval key, and returns a retrieval result to a demander. Further, the retriever 8, in a case where the normalized retrieval key (normalization retrieval key) has been input from the retrieval key normalizer 15, retrieves the corresponding data from the data storage 7 according to the pointer set to the drawer 6 correspondingly to the above-mentioned normalized retrieval key, and returns a retrieval result to a demander.

Additionally, the data management device of this exemplary embodiment can be realized with a computer, and so as to realize the data management device with the computer, for example, proceed as follows. A disc, a semiconductor memory, or a record medium other than them, in which a program for causing the computer to function as a data management device has been recorded, is prepared to cause the computer to read off the above-mentioned program. The computer controls its own operation according to the read-off program, thereby allowing the UNICODE data processor 1, the register 5, and the retriever 8 to be realized over its own computer.

Explanation of an Operation of the Exemplary Embodiment

Next, an operation of this exemplary embodiment will be explained in details.

[Operation at the Time of Registering Data]

At first, an operation at the time of registering data will be explained by employing FIG. 3 to FIG. 9. Additionally, 「か」, 「が」, and 「み」 shown in FIG. 5 are pronounced as "ka", "ga", and "mi", respectively. Further, 「゛」 is a voiced sound mark. In addition hereto, 「ハ」 and 「ン」 shown in FIG. 7 are pronounced as "ha" and "n", respectively. Further, 「゜」 is a semi-voiced sound mark.

At the time of registering the registration data, the user firstly designates the option classification by employing the option designator 3. That is, at the time of registering the registration data including the composing character or the compatibility character, the user designates the second option classification by employing the option designator 3 in a case of making the registration data retrievable with the retrieval key as well for which the NFC normalization process has been performed, it designates the third option classification in a case of making the registration data retrievable with the retrieval key as well for which the NFKC normalization process has been performed, and it designates the fourth option classification in a case of making the registration data retrievable with the retrieval key as well for which both of the NFC normalization process and the NFKC normalization process have been performed. Further, the user designates the first option in a case of making the registration data unretrievable with the normalized retrieval key. Thereafter, the user inputs the registration data by employing the registration data input device 2.

When the registration data is input from the registration data input device 2, the input process switcher 11 delivers the registration data to the register 5 and the key item normalizer 12, and delivers the option classification designated by the option designator 3 to the key item normalizer 12, as shown in a flowchart of FIG. 3 (step S31).

The key item normalizer 12 performs the process described below, responding to the option classification delivered from the input process switcher 11.

When the option classification delivered from the input process switcher 11 is the first option, the key item normalizer 12 outputs the key item being included in the registration data delivered from the input process switcher 11 as it stands.

Further, when the option classification delivered from the input process switcher 11 is the second option (NFC normalization), the key item normalizer 12 performs the process shown in a flowchart of FIG. 4. Now, for example, it it is assumed that the content of the normalization process table 13 is one shown in FIG. 2, and the key item being included in the registration data delivered from the input process switcher 11 is 501, as shown in (A) of FIG. 5, the following process is performed.

The key item normalizer 12 firstly sets to 1 a value of a variable i indicating the positional number of the character of the key item that is assumed to be a to-be-watched character (step S41), and watches the first character 「か」 of the key item (step S42). Thereafter, the key item normalizer 12 sets to 1 a value of a variable j indicating the positional number of the character from the to-be-watched character (step S44), and determines whether or not the first character 「か」 and the second character 「か」 can be composed by making a reference to the normalization process table 13 (step S45). In this case, the key item normalizer 12 determines that they are not composable because the composition/compatibility 203 corresponding to the character code [304B] of the first character 「か」 indicates that the composition is possible, but the character code of the second character 「か」 has not been set in compositions 1 to 3 (204 to 206) (No in step S45).

When the key item normalizer 12 determines that the first character and the second character cannot be composed (No in step S45), it preserves the character code [304B] of the first character 「か」 inside it (step S48), and watches the second character 「か」 (step S49 and step S42).

Thereafter, the key item normalizer 12 determines whether or not the second character 「か」 and the third character 「゛」 can be composed by making a reference to the normalization process table 13 (step S45). In this case, the key item normalizer 12 determines that they are composable because the composition/compatibility 203 corresponding to the second character 「か」 indicates that the composition is possible and yet the character code [309B] of the third character has been set in the compositions 1 (204).

When the key item normalizer 12 determines that they are composable (Yes in step S45), it obtains a character code [304C] of the character 「が」obtained by composing the second character 「か」and the third character 「 ゛ 」, and assumes it to be a to-be-watched character code (step S46). Thereafter, the key item normalizer 12 increments the variable j (step S47), and determines whether or not the character 「が」 which is expressed by the to-be-watched character code [304C], and the fourth character 「み」can be composed (step S45). In this case, the key item normalizer 12 determines that the they are not composable because the composition/compatibility 203 corresponding to the character 「が」(the character code; 304C) indicates that the composition is impossible (No in step S45).

And, when the key item normalizer 12 determines that they are not composable, it preserves the to-be-watched character code inside it (step S48), and watches the fourth character (step S49 and step S42). Hereinafter, the key item normalizer 12 repeats a process similar to the foregoing process until a not-yet-watched character is used up. And, when the not-yet-watched character is used up (Yes in step S43), the key item normalizer 12 delivers the character code (normalization result) preserved inside it to the register 5 (step S50). In FIG. 5 (B), a normalization result 502 in the case of this example is shown.

Figure 6:
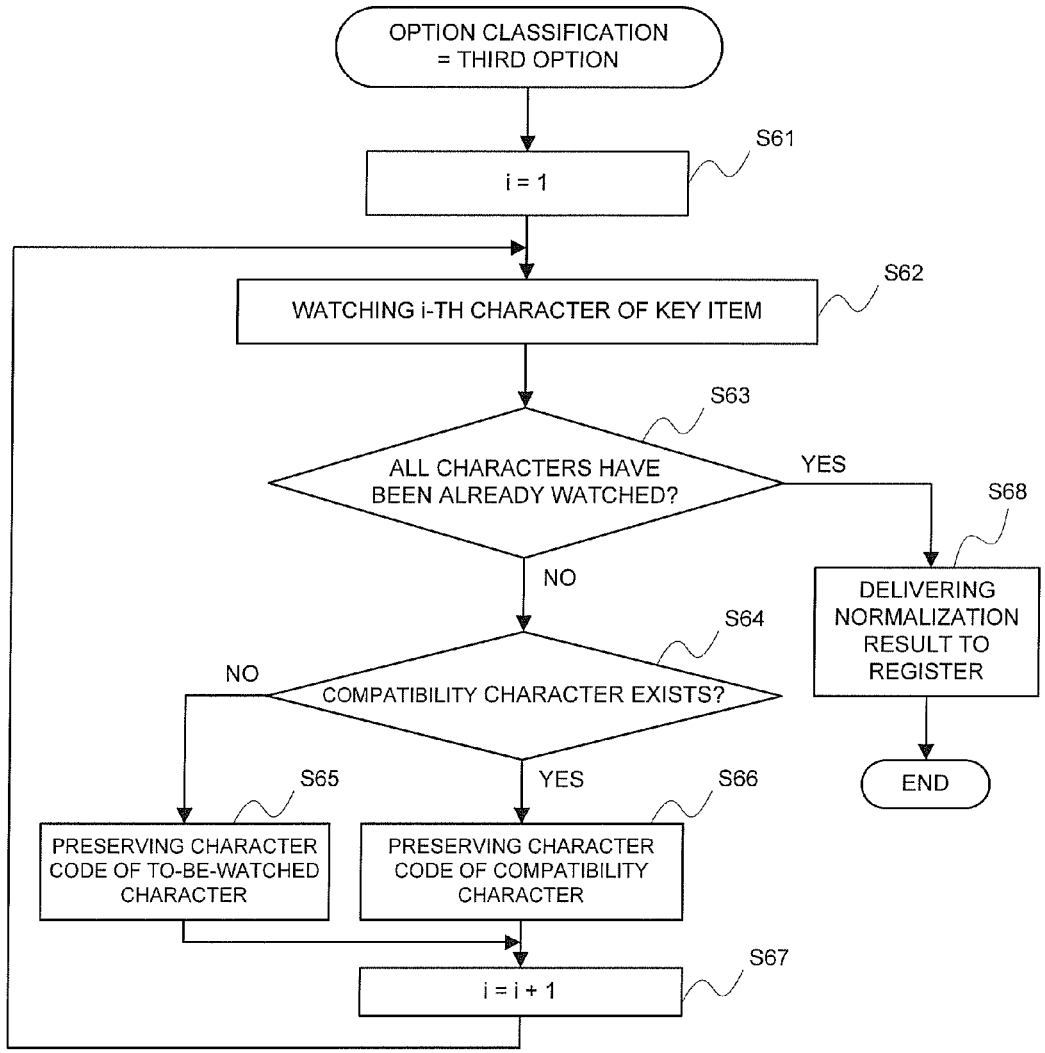
FIG. 6 is a flowchart illustrating an example of a process of the key item normalizer 12 at the time that a third option has been designated as an option classification.
Figure 7:
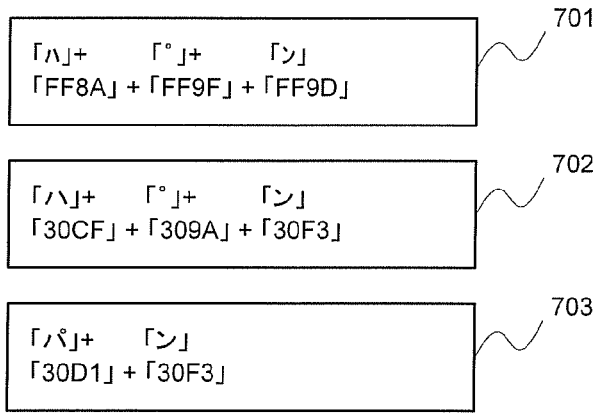
FIG. 7 is a view for explaining a process of the key item normalizer 12.

Further, when the option classification delivered from the input process switcher 11 is the third option (NFKC normalization), the process shown in a flowchart of FIG. 6 is performed. Now, for example, if it is assumed that the content of the normalization process table 13 is one shown in FIG. 2 and the key item being included in the registration data delivered from the input process switcher 11 is 「ﾊ(half-width)+°(half-width)+ﾝ(half-width) 」701 shown in FIG. 7, the process described below is performed.

The key item normalizer 12 firstly sets to 1 a value of a variable i indicating the positional number of the character of the key item that is assumed to be a watched character (step S61), and watches the first character 「ﾊ(half-width) of the key item (step S62). Thereafter, the key item normalizer 12 investigates whether or not the compatibility character that corresponds to the character 「ﾊ(half-width) exists by making a reference to the normalization process table 13 (step S64), preserves the character code of the watched character if no compatibility character exists (step S65), and preserves the character code of the compatibility character if the compatibility character exists (step S66). In the case of this example, the normalization process table 13 preserves the character code [30CF] of the compatibility character because the composition/compatibility 203 corresponding to the character 「ﾊ(half-width) indicates that the compatibility is possible and yet [30CF] has been set in a after-conversion character code 307.

Thereafter, the key item normalizer 12 increments the variable i (step S67), and watched the second character 「 ゜ 」(half-width) (step S62). Hereinafter, the key item normalizer 12 repeats the foregoing process until a not-yet-watched character is used up. And, when the not-yet-watched character is used up, the key item normalizer 12 delivers the character code (normalization result) preserved inside it to the register 5 (step 68). As a normalization result in this example, 「ハ(full-width)+「 ゜ 」(full-width)+「ン」(full-width) 」is obtained as shown in 702 of FIG. 7.

Figure 8:
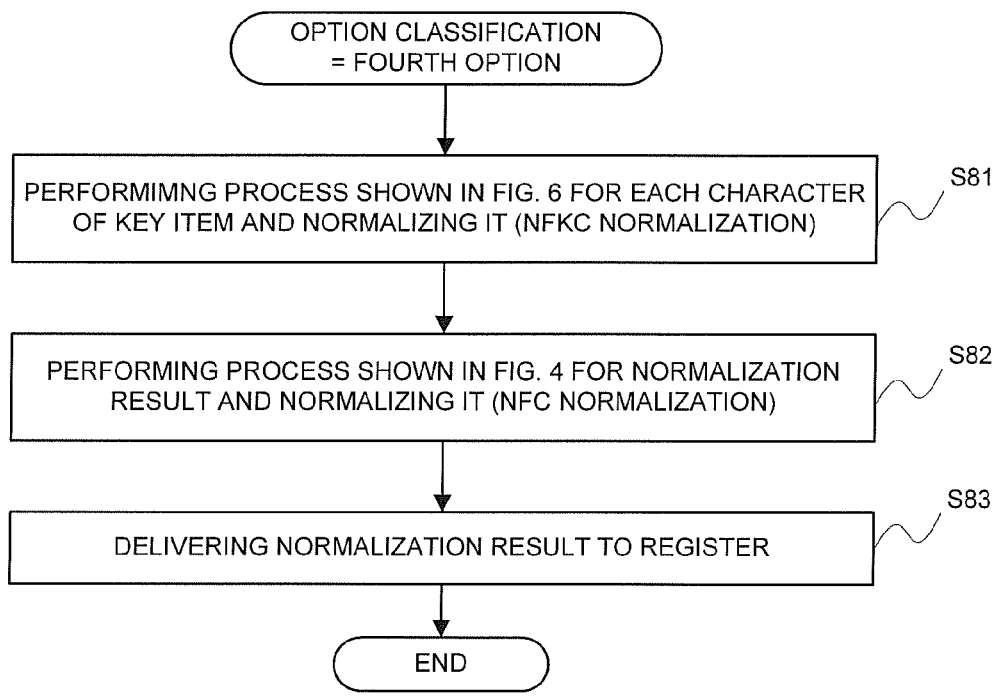
FIG. 8 is a flowchart illustrating an example of a process of the key item normalizer 12 at the time that a fourth option has been designated as an option classification.
Figure 9:
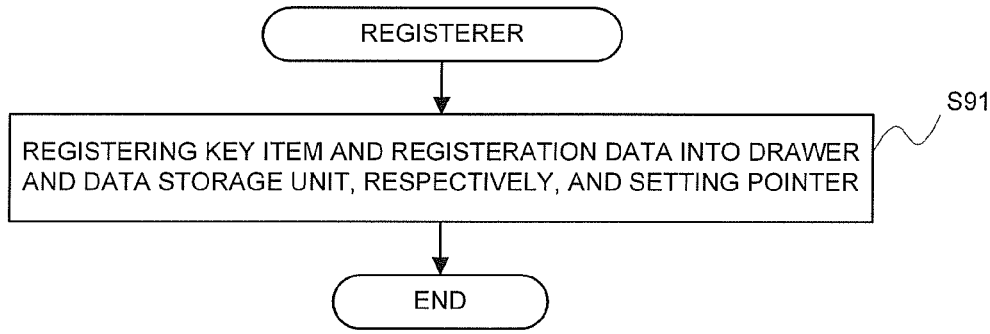
FIG. 9 is a flowchart illustrating an example of a process of a register 5.

Further, when the value of the option classification delivered from the input process switcher 11 is the fourth option (both of the NFC normalization and the NFKC normalization), the process shown in a flowchart of FIG. 8 is performed. Now, for example, if it is assumed that the content of the normalization process table 13 is one shown in FIG. 2, and the key item being included in the registration data delivered from the input process switcher 11 is 「ﾊ(half-width)+°(half-width)+ﾝ(half-width) 」701 shown in FIG. 7, the process described below is performed.

The key item normalizer 12 firstly performs the normalization process (the NFKC normalization) shown in a flowchart of FIG. 6 for the key item 「ﾊ(half-width)+°(half-width)+ﾝ(half-width) 」701 (step S81). As a result, a normalization result 「ハ(full-width)+°(full-width)+ン(full-width) 」702 shown in FIG. 7 is obtained.

Thereafter, the key item normalizer 12 performs the normalization process (NFC normalization process) shown in a flowchart of FIG. 4 for the normalization result 「ハ(full-width)+°(full-width)+ン(full-width) 」702 (step S82). As a result, a normalization result 「パ(full-width)+ン(full-width) 」703 shown in FIG. 7 is obtained.

And, the key item normalizer 12 lastly delivers the normalization result to the register 5 (step S83).

Next an operation of the register 5 will be explained. As shown in a flowchart of FIG. 9, when the registration data and the key item are delivered from the input process switcher 11 and from the key item switcher 12, respectively, the register 5 registers the registration data into the data storage 7, registers the key item into the drawer 6, and further sets to the key item a pointer to the registration data registered into the data storage 7 (step S91).

[An Operation at the Time of Retrieval]

Next, an operation at the time of retrieving will be explained.

At the time of retrieving, the user firstly designates the option classification responding to a purpose of the retrieval by employing the option designator 3. That is, the user designates the first option in a case of desiring to retrieve data by employing the retrieval key as it stands (in a case of desiring to retrieve data that coincides only with the retrieval key), it designates the second option in a case of desiring to retrieve data by employing the normalization retrieval key obtained by performing the NFC normalization process for the retrieval key (in a case of desiring to retrieve data that coincides with the retrieval key for which the NFC normalization process has been performed), it designates the third option in a case of desiring to retrieve data by employing the normalization retrieval key obtained by performing the NFKC normalization process for the retrieval key, and it designates the fourth option in a case of desiring to retrieve data by employing the normalization retrieval key obtained by performing both of the NFC normalization process and the NFKC normalization process for the retrieval key. Thereafter, the user inputs the retrieval key from the retrieval key input device 4.

Figure 10:
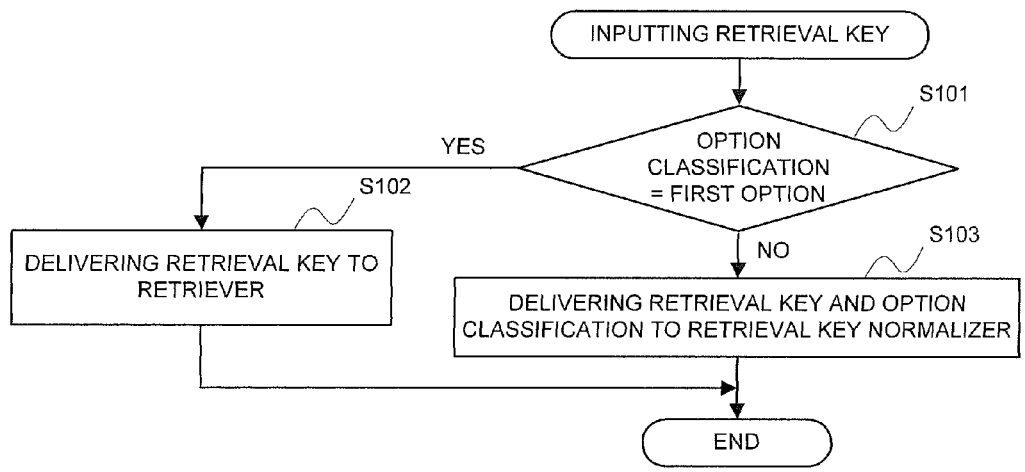
FIG. 10 is a flowchart illustrating an example of a process of an retrieval process switcher 14.

When the retrieval key is input, the retrieval process switcher 14 within the UNICODE data processor 1 determines whether or not the option classification designated by the option designator 3 is the first option, as shown in a flowchart of FIG. 10 (step S101). And, the retrieval process switcher 14 delivers the retrieval key to the retriever 8 (step S102) in a case of having determined that the first option has been designated (Yes in step S101). On the other hand, the retrieval process switcher 14 delivers the retrieval key and the option classification to the retrieval key normalizer 15 (step S103) in a case of having determined that one of the second option to the fourth option has been designated (No in step S101).

Figure 11:
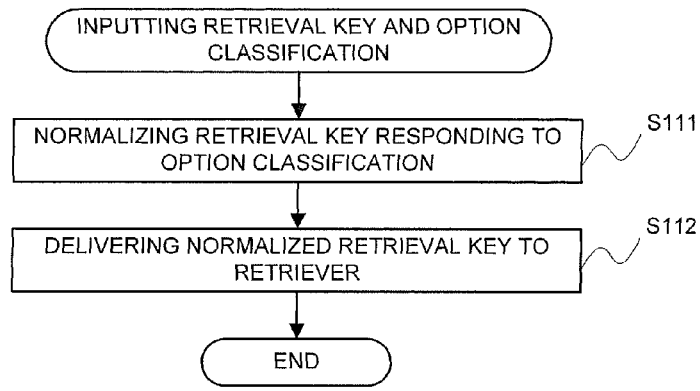
FIG. 11 is a flowchart illustrating an example of a process of a retrieval key normalizer 15.

When the retrieval key and the option classification are delivered from the retrieval process switcher 14, the retrieval key normalizer 15 normalizes the retrieval key responding to the option classification as shown in a flowchart of FIG. 11 (step S111). That is, the retrieval key normalizer 15 performs a process similar to the normalizing process shown in a flowchart of FIG. 4 when the value of the option classification is the second option, it performs a process similar to the normalizing process shown in a flowchart of FIG. 6 when it is the third option, and it performs a process similar to the normalizing process shown in a flowchart of FIG. 8 when it is the fourth option. Thereafter, the retrieval key normalizer 15 delivers the normalized retrieval key to the retriever 8 (step S112).

Figure 12:
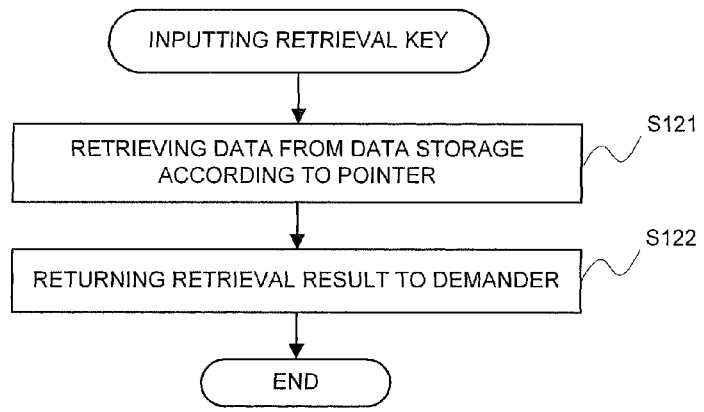
FIG. 12 is a flowchart illustrating an example of a process of a retriever 8.

When the retrieval key is delivered from the retrieval process switcher 14 or the retrieval key normalizer 15, the retriever 8 retrieves the corresponding data from the data storage 7 according to a pointer that has been set to the drawer 6 correspondingly to the above-mentioned key, and returns a retrieval result to a demander, as shown in FIG. 12 (step S121 and S122).

Additionally, this exemplary embodiment is applicable to DBMS (database management system). In a case of having applied this exemplary embodiment to the DBMS, the input of the registration data from the registration data inpputer 2 corresponds to a data operation that is executed by an INSERT sentence and an UPDATE sentence in a SQL sentence, and the input of the retrieval key from the retrieval key inpputer 4 corresponds to a designation of a retrieval condition for a SELECT sentence, an UPDATE sentence, and a DELETE sentence in a SQL sentence.

Additionally, in the above explanation, 「かがみ（か ＋ か＋゛ ＋ み）」was employed as a composing character for explanation, and the one character that can be prepared from a plurality of characters, for example, 「°C．（°＋C）」, 「±（"＋"＋"－"）」, 「⇒（"＝"＋"＞"）」, or the like is acceptable. Further, 「パ(full-width)=ﾊﾟ(half-width)」 was employed for explanation as a compatibility character, and the character that can be interchanged to a similar character, for example, 「ＪＡＰＡＮ (full-width)」=「JAPAN (half-width)」, 「１」=「I or i (Roman numeral)」, or the like is acceptable.

En Effect of the Exemplary Embodiment

This exemplary embodiment makes it possible to obtain a retrieval result suited for a user' desire in a case of retrieving data expressed by the code system such as the UNICODE in which techniques of expressing one character exist in plural. The reason is that the register 5 for registering the key item (draw key) into the drawer 6, and the option designator 3 for designating whether or not to normalize the retrieval key are provided. That is, the exemplary embodiment makes it possible to obtain the retrieval result suited for a user' desire because the user freely can set how to handle the composing character or the compatibility character (determines that it coincides, or determines that it does not coincide).

Further, this exemplary embodiment, which makes a rule to perform the normalization process with the precomposed character assumed to be a base character (to perform the normalization process until the composition becomes impossible), enables the data quantity being stored into the drawer 6 to be reduced.

The present invention is preferredly applied to the DBMS etc. for managing data expressed by the code system such as the UNICODE in which techniques of expressing one character exist in plural.

Additionally, in the explanation above, the configuration was employed for explanation in which the registration into the data storage 7 and the retrieval from the data storage 7 can be executed by one device, and the configuration, in which the registration and the retrieval can be executed separately, is also acceptable. For example, the registration device may include the registration data input device 2, the option designator 3, the register 5, the drawer 6, the data storage 7, the input process switcher 11, the key item normalizer 12, and the normalization process table 13 in some cases, and the registration device may include the option designator 3, the retrieval key input device 4, the drawer 6, the data storage 7, the retriever 8, the normalization process table 13, the retrieval process switcher 14, and the retrieval key normalizer 15 in some cases.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

What is claimed is:

1. A data management system, comprising:
a designator for designating whether or not to perform a normalization process for registration data or retrieval data that has been input, the designator being a sole and only global designator for all of the registration data or the retrieval data to indicate whether or not any aspect of the normalization process is to be performed regardless of content of the registration data or the retrieval data, the designator not performing the normalization process;
a data processor for performing the normalization process for the registration data or the retrieval data that has been input according to a designation by said designator;
a register for registering the registration data, which has been input, into a data storage, registering the registration data, for which said normalization process has been performed, into a drawer, and setting to the data registered into this drawer a pointer to the data registered into said data storage; and
a retriever for employing the retrieval data, which has been input, or the retrieval data, for which said normalization process has been performed, to retrieve the pointer of its retrieval data from said drawer, and acquiring corresponding data from said data storage,
wherein said data processor performs a first normalization process of normalizing said registration data or said retrieval data that has been input by converting a combining character sequence being included in the registration data or the retrieval data that has been input to a precomposed character, and a second normalization process of normalizing said input data by converting a compatibility character being included in the registration data or the retrieval data that has been input to a character pre-decided for the above compatibility character,
wherein the second normalization process is further to convert half-width characters into full-width characters, and wherein the first normalization process is performable after the second normalization process.

2. The data management system according to claim 1, wherein said data processor can perform plural type of the normalization processes; and wherein said designator, at the moment of designating execution of the normalization process, designates a classification of the normalization process being executed.

3. The data management system according to claim 1, wherein:

in a first scenario, the designator outputs the registration data and a key item within the registration data such that no normalization process is performed;

in a second scenario, the designator outputs the registration data, and the data processor performs the first normalization process for the key item and outputs the key item as subjected to the first normalization process such that the second normalization process is not performed;

in a third scenario, the designator outputs the registration data, and the data processor performs the second normalization process for the key item and outputs the key item as subjected to the second normalization process such that the first normalization process is not performed;

in a fourth scenario, the designator outputs the registration data, and the data processor performs the second normalization process and then the first normalization process for the key item and outputs the key item as subjected to both the second normalization process and the first normalization process such that both the first normalization process and the second normalization process are performed.

4. A data registration device, comprising:

a designator for designating whether or not to perform a normalization process for registration data that has been input, the designator being a sole and only global designator for all of the registration data to indicate whether or not any aspect of the normalization process is to be performed regardless of content of the registration data, the designator not performing the normalization process;

a data processor for performing the normalization process for the registration data that has been input according to a designation by said designator; and a register for registering the registration data, which has been input, into a data storage, registering the registration data for which said normalization process has been performed into a drawer, and setting to the data registered into this drawer a pointer to the data registered into said data storage, wherein said data processor performs a first normalization process of normalizing said registration data or said retrieval data that has been input by converting a combining character sequence being included in the registration data or the retrieval data that has been input to a precomposed character, and a second normalization process of normalizing said input data by converting a compatibility character being included in the registration data or the retrieval data that has been input to a character pre-decided for the above compatibility character, wherein the second normalization process is further to convert half-width characters into full-width characters, and wherein the first normalization process is performable after the second normalization process.

5. The data registration device according to claim 4, wherein said data processor can perform plural type of the normalization processes; and wherein said designator, at the moment of designating execution of the normalization process, designates a classification of the normalization process being executed.

6. The data registration device according to claim 4, wherein:

in a first scenario, the designator outputs the registration data and a key item within the registration data such that no normalization process is performed;

in a second scenario, the designator outputs the registration data, and the data processor performs the first normalization process for the key item and outputs the key item as subjected to the first normalization process such that the second normalization process is not performed;

in a third scenario, the designator outputs the registration data, and the data processor performs the second normalization process for the key item and outputs the key item as subjected to the second normalization process such that the first normalization process is not performed;

in a fourth scenario, the designator outputs the registration data, and the data processor performs the second normalization process and then the first normalization process for the key item and outputs the key item as subjected to both the second normalization process and the first normalization process such that both the first normalization process and the second normalization process are performed.

7. A data retrieval device, comprising:

a designator for designating whether or not to perform a normalization process for retrieval data that has been input, the designator being a sole and only global designator for all of the retrieval data to indicate whether or not any aspect of the normalization process is to be performed regardless of content of the retrieval data, the designator not performing the normalization process;

a data processor for performing the normalization process for the retrieval data that has been input according to a designation by said designator; and a retriever for employing the retrieval data, which has been input, or the retrieval data, for which said normalization process has been performed, to retrieve a pointer of its retrieval data from a drawer, and acquiring corresponding data from a data storage, wherein said data processor performs a first normalization process of normalizing said registration data or said retrieval data that has been input by converting a combining character sequence being included in the registration data or the retrieval data that has been input to a precomposed character, and a second normalization process of normalizing said input data by converting a compatibility character being included in the registration data or the retrieval data that has been input to a character pre-decided for the above compatibility character, wherein the second normalization process is further to convert half-width characters into full-width characters, and wherein the first normalization process is performable after the second normalization process.

8. The data retrieval device according to claim 7, wherein said data processor can perform plural type of the normalization processes; and wherein said designator, at the moment of designating execution of the normalization process, designates a classification of the normalization process being executed.

9. The data retrieval device according to claim 7, wherein:
in a first scenario, the designator outputs the registration data and a key item within the registration data such that no normalization process is performed;
in a second scenario, the designator outputs the registration data, and the data processor performs the first normalization process for the key item and outputs the key item as subjected to the first normalization process such that the second normalization process is not performed;
in a third scenario, the designator outputs the registration data, and the data processor performs the second normalization process for the key item and outputs the key item as subjected to the second normalization process such that the first normalization process is not performed;
in a fourth scenario, the designator outputs the registration data, and the data processor performs the second normalization process and then the first normalization process for the key item and outputs the key item as subjected to both the second normalization process and the first normalization process such that both the first normalization process and the second.

10. A data management method, comprising:
a designation step of designating whether or not to perform a normalization process for registration data or retrieval data that has been input, the designating being a sole and only global designating for all of the registration data or the retrieval data to indicate whether or not any aspect of the normalization process is to be performed regardless of content of the registration data or the retrieval data, the designation step performed by a designator, the designator not performing the normalization process;
a data processing step of performing the normalization process for the registration data or the retrieval data that has been input according to a designation in said designation step, the data processing step performed by a data processor;
a first registration step of registering the registration data, which has been input, into a data storage;
a second registration step of registering the registration data for which said normalization process has been performed into a drawer, and setting to the data registered into this drawer a pointer to the data registered in said first registration step; and
a retrieval step of employing the retrieval data, which has been input, or the retrieval data, for which said normalization process has been performed, to retrieve a pointer of its retrieval data from said drawer, and acquiring corresponding data from said data storage,
wherein said data processor performs a first normalization process of normalizing said registration data or said retrieval data that has been input by converting a combining character sequence being included in the registration data or the retrieval data that has been input to a precomposed character, and a second normalization process of normalizing said input data by converting a compatibility character being included in the registration data or the retrieval data that has been input to a character pre-decided for the above compatibility character,
wherein the second normalization process is further to convert half-width characters into full-width characters,
and wherein the first normalization process is performable after the second normalization process.

11. A data registration method, comprising:
a designation step of designating whether or not to perform a normalization process for registration data that has been input, the designating being a sole and only global designating for all of the registration data to indicate whether or not any aspect of the normalization process is to be performed regardless of content of the registration data, the designation step performed by a designator, the designator not performing the normalization process;
a data processing step of performing the normalization process for the registration data that has been input according to a designation in said designation step, the data processing step performed by a data processor;
a first registration step of registering the registration data, which has been input, into a data storage; and
a second registration step of registering the registration data for which said normalization process has been performed into a drawer, and setting to the data registered into this drawer a pointer to the data registered in said first registration step,
wherein said data processor performs a first normalization process of normalizing said registration data or said retrieval data that has been input by converting a combining character sequence being included in the registration data or the retrieval data that has been input to a precomposed character, and a second normalization process of normalizing said input data by converting a compatibility character being included in the registration data or the retrieval data that has been input to a character pre-decided for the above compatibility character,
wherein the second normalization process is further to convert half-width characters into full-width characters,
and wherein the first normalization process is performable after the second normalization process.

12. A data retrieval method, comprising:
a designation step of designating whether or not to perform a normalization process for retrieval data that has been input, the designator being a sole and only global designator for all of the retrieval data to indicate whether or not any aspect of the normalization process is to be performed regardless of content of the retrieval data, the designation step performed by a designator, the designator not performing the normalization process;
a data processing step of performing the normalization process for the registration data that has been input according to a designation in said designation step, the data processing step performed by a data processor; and
a retrieval step of employing the retrieval data, which has been input, or the retrieval data, for which said normalization process has been performed, to retrieve a pointer of its retrieval data from a drawer, and acquiring corresponding data from a data storage,
wherein said data processor performs a first normalization process of normalizing said registration data or said retrieval data that has been input by converting a combining character sequence being included in the registration data or the retrieval data that has been input to a precomposed character, and a second normalization process of normalizing said input data by converting a compatibility character being included in the registration data or the retrieval data that has been input to a character pre-decided for the above compatibility character,
wherein the second normalization process is further to convert half-width characters into full-width characters,
and wherein the first normalization process is performable after the second normalization process.

13. A non-transitory computer-readable storage medium storing a computer program that is executable by an information processing hardware unit, wherein execution of the computer program by the information processing hardware unit causes a method to be performed, the method comprising:

a designation step of designating whether or not to perform a normalization process for registration data that has been input, the designating being a sole and only global designating for all of the registration data to indicate whether or not any aspect of the normalization process is to be performed regardless of content of the registration data, the designation step performed by a designator, the designator not performing the normalization process;

a data processing step of performing the normalization process for the registration data that has been input according to a designation in said designation step, the data processing step performed by a data processor;

a first registration step of registering the registration data, which has been input, into a data storage; and a second registration step of registering the registration data for which said normalization process has been performed into a drawer, and setting to the data registered into this drawer a pointer to the data registered in said first registration step, wherein said data processor performs a first normalization process of normalizing said registration data or said retrieval data that has been input by converting a combining character sequence being included in the registration data or the retrieval data that has been input to a precomposed character, and a second normalization process of normalizing said input data by converting a compatibility character being included in the registration data or the retrieval data that has been input to a character pre-decided for the above compatibility character, wherein the second normalization process is further to convert half-width characters into full-width characters, and wherein the first normalization process is performable after the second normalization process.

14. A non-transitory computer-readable storage medium storing a computer program that is executable by an information processing hardware unit, wherein execution of the computer program by the information processing hardware unit causes a method to be performed, the method comprising:

a designation step of designating whether or not to perform a normalization process for retrieval data that has been input, the designator being a sole and only global designator for all of the retrieval data to indicate whether or not any aspect of the normalization process is to be performed regardless of content of the retrieval data, the designation step performed by a designator, the designator not performing the normalization process;

a data processing step of performing the normalization process for the retrieval data that has been input according to a designation in said designation step, the data processing step performed by a data processor; and a retrieval step of employing the retrieval data, which has been input, or the retrieval data, for which said normalization process has been performed, to retrieve a pointer of its retrieval data from a drawer, and acquiring corresponding data from a data storage, wherein said data processor performs a first normalization process of normalizing said registration data or said retrieval data that has been input by converting a combining character sequence being included in the registration data or the retrieval data that has been input to a precomposed character, and a second normalization process of normalizing said input data by converting a compatibility character being included in the registration data or the retrieval data that has been input to a character pre-decided for the above compatibility character, wherein the second normalization process is further to convert half-width characters into full-width characters, and wherein the first normalization process is performable after the second normalization process.

15. The data management method of claim 10, wherein:
in a first scenario, the designator outputs the registration data and a key item within the registration data such that no normalization process is performed;
in a second scenario, the designator outputs the registration data, and the data processor performs the first normalization process for the key item and outputs the key item as subjected to the first normalization process such that the second normalization process is not performed;
in a third scenario, the designator outputs the registration data, and the data processor performs the second normalization process for the key item and outputs the key item as subjected to the second normalization process such that the first normalization process is not performed;
in a fourth scenario, the designator outputs the registration data, and the data processor performs the second normalization process and then the first normalization process for the key item and outputs the key item as subjected to both the second normalization process and the first normalization process such that both the first normalization process and the second.

16. The data registration method of claim 11, wherein:
in a first scenario, the designator outputs the registration data and a key item within the registration data such that no normalization process is performed;
in a second scenario, the designator outputs the registration data, and the data processor performs the first normalization process for the key item and outputs the key item as subjected to the first normalization process such that the second normalization process is not performed;
in a third scenario, the designator outputs the registration data, and the data processor performs the second normalization process for the key item and outputs the key item as subjected to the second normalization process such that the first normalization process is not performed;
in a fourth scenario, the designator outputs the registration data, and the data processor performs the second normalization process and then the first normalization process for the key item and outputs the key item as subjected to both the second normalization process and the first normalization process such that both the first normalization process and the second.

17. The data retrieval method of claim 12, wherein:
in a first scenario, the designator outputs the registration data and a key item within the registration data such that no normalization process is performed;
in a second scenario, the designator outputs the registration data, and the data processor performs the first normalization process for the key item and outputs the key item as subjected to the first normalization process such that the second normalization process is not performed;
in a third scenario, the designator outputs the registration data, and the data processor performs the second normalization process for the key item and outputs the key item as subjected to the second normalization process such that the first normalization process is not performed;
in a fourth scenario, the designator outputs the registration data, and the data processor performs the second normalization process and then the first normalization process for the key item and outputs the key item as subjected to both the second normalization process and the first normalization process such that both the first normalization process and the second.

18. The non-transitory computer-readable data storage medium of claim 13, wherein:
- in a first scenario, the designator outputs the registration data and a key item within the registration data such that no normalization process is performed;
- in a second scenario, the designator outputs the registration data, and the data processor performs the first normalization process for the key item and outputs the key item as subjected to the first normalization process such that the second normalization process is not performed;
- in a third scenario, the designator outputs the registration data, and the data processor performs the second normalization process for the key item and outputs the key item as subjected to the second normalization process such that the first normalization process is not performed;
- in a fourth scenario, the designator outputs the registration data, and the data processor performs the second normalization process and then the first normalization process for the key item and outputs the key item as subjected to both the second normalization process and the first normalization process such that both the first normalization process and the second.

19. The non-transitory computer-readable data storage medium of claim 14, wherein:
- in a first scenario, the designator outputs the registration data and a key item within the registration data such that no normalization process is performed;
- in a second scenario, the designator outputs the registration data, and the data processor performs the first normalization process for the key item and outputs the key item as subjected to the first normalization process such that the second normalization process is not performed;
- in a third scenario, the designator outputs the registration data, and the data processor performs the second normalization process for the key item and outputs the key item as subjected to the second normalization process such that the first normalization process is not performed;
- in a fourth scenario, the designator outputs the registration data, and the data processor performs the second normalization process and then the first normalization process for the key item and outputs the key item as subjected to both the second normalization process and the first normalization process such that both the first normalization process and the second.

\* \* \* \* \*